(12) United States Patent
Scalfani et al.

(10) Patent No.: US 7,515,984 B2
(45) Date of Patent: *Apr. 7, 2009

(54) METHOD AND SYSTEM FOR MONITORING BATCH PRODUCT MANUFACTURING

(75) Inventors: Charles J. Scalfani, Laguna Niquel, CA (US); Donald L. Gaudino, Yorba Linda, CA (US); Craig A. Nelson, Mission Viejo, CA (US); Steven C. McCormick, Las Flores, CA (US); Therese M. Sonnenfeld, Lake Forest, CA (US); Todd A. Soutar, Cincinnati, OH (US)

(73) Assignee: Vigilstics, Inc., Mission Viejo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/777,840

(22) Filed: Jul. 13, 2007

(65) Prior Publication Data

US 2008/0015730 A1 Jan. 17, 2008

Related U.S. Application Data

(63) Continuation of application No. 10/931,849, filed on Sep. 1, 2004, now Pat. No. 7,248,938.

(60) Provisional application No. 60/533,498, filed on Dec. 31, 2003.

(51) Int. Cl.
*G06F 19/00* (2006.01)

(52) U.S. Cl. ........................ 700/110; 700/108; 700/285; 99/452

(58) Field of Classification Search ................. 700/108, 700/110, 285; 99/452
See application file for complete search history.

(56) References Cited

U.S. PATENT DOCUMENTS

| 3,871,623 | A | * | 3/1975 | Boenisch ..................... 366/111 |
| 5,321,605 | A | * | 6/1994 | Chapman et al. ............... 705/7 |
| 6,108,662 | A | * | 8/2000 | Hoskins et al. ............. 707/102 |
| 6,148,239 | A | * | 11/2000 | Funk et al. ...................... 700/1 |
| 6,355,290 | B1 | * | 3/2002 | Soehnlen et al. ............ 426/393 |
| 2002/0072079 | A1 | * | 6/2002 | Woodaman ................ 435/7.32 |
| 2003/0185937 | A1 | * | 10/2003 | Garwood ..................... 426/35 |
| 2003/0185948 | A1 | * | 10/2003 | Garwood .................... 426/392 |
| 2004/0018641 | A1 | * | 1/2004 | Goldsmith et al. .......... 436/518 |
| 2006/0286006 | A1 | * | 12/2006 | McDaniel et al. ........... 422/129 |

* cited by examiner

*Primary Examiner*—Michael D Masinick
(74) *Attorney, Agent, or Firm*—Knobbe Martens Olson & Bear LLP

(57) ABSTRACT

A system and method for monitoring product through a batch manufacturing plant is provided. The system includes, a parallel flow mode when product flows concurrently from at least two units to a single unit; and a serial flow mode where product flows from one unit to another at a given time, wherein the batch manufacturing plant is modeled based on the parallel and serial flow modes. A lot association is built based on product flow and a parent/child record is created for lot association. The system also includes a data collection system that collects phase information for every unit and a procedure identifier is used to create a batch identifier, where a batch identifier is associated with each lot on each unit through which product is flowing to and/or from at a given time.

5 Claims, 11 Drawing Sheets

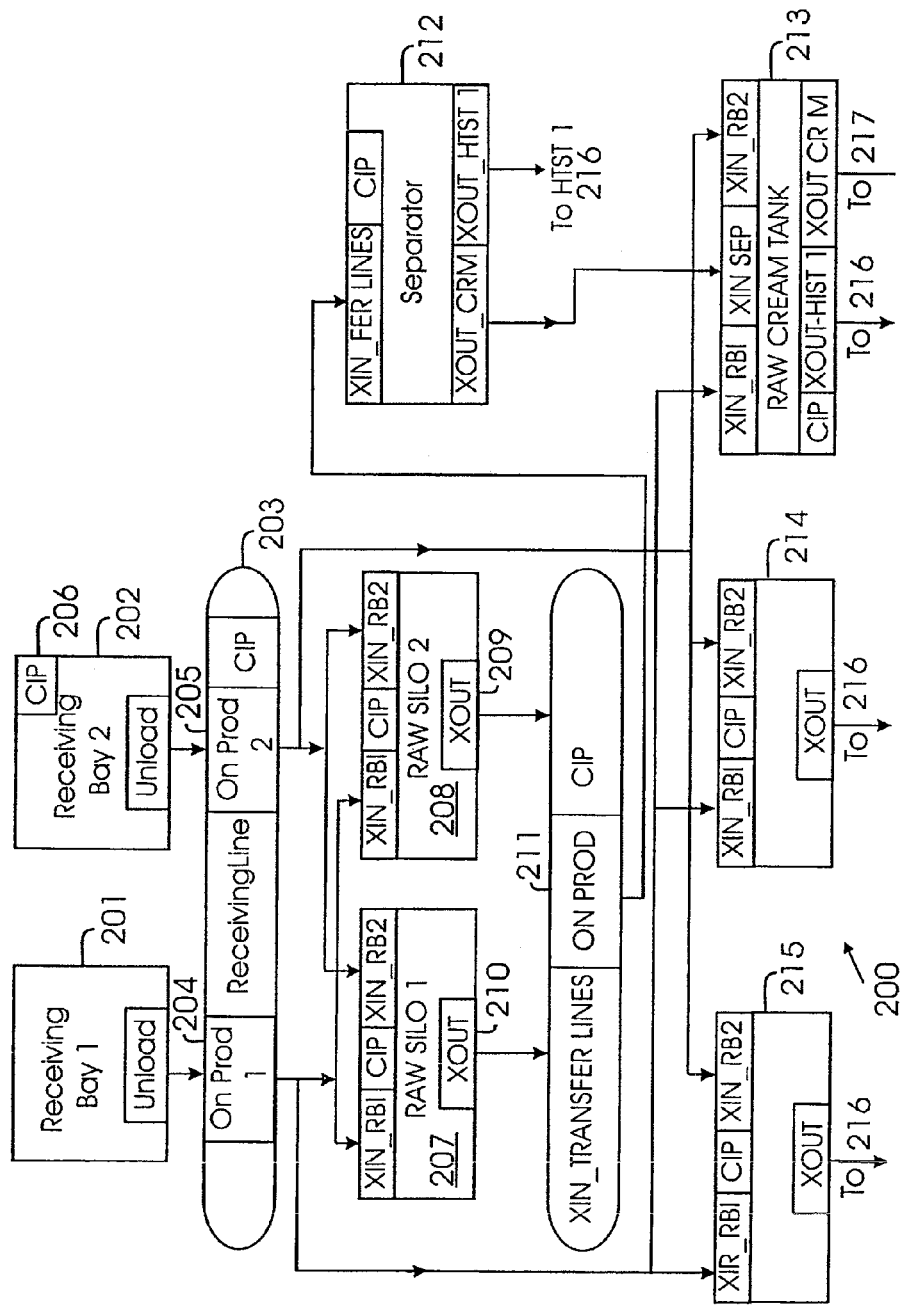
FIGURE 2-A

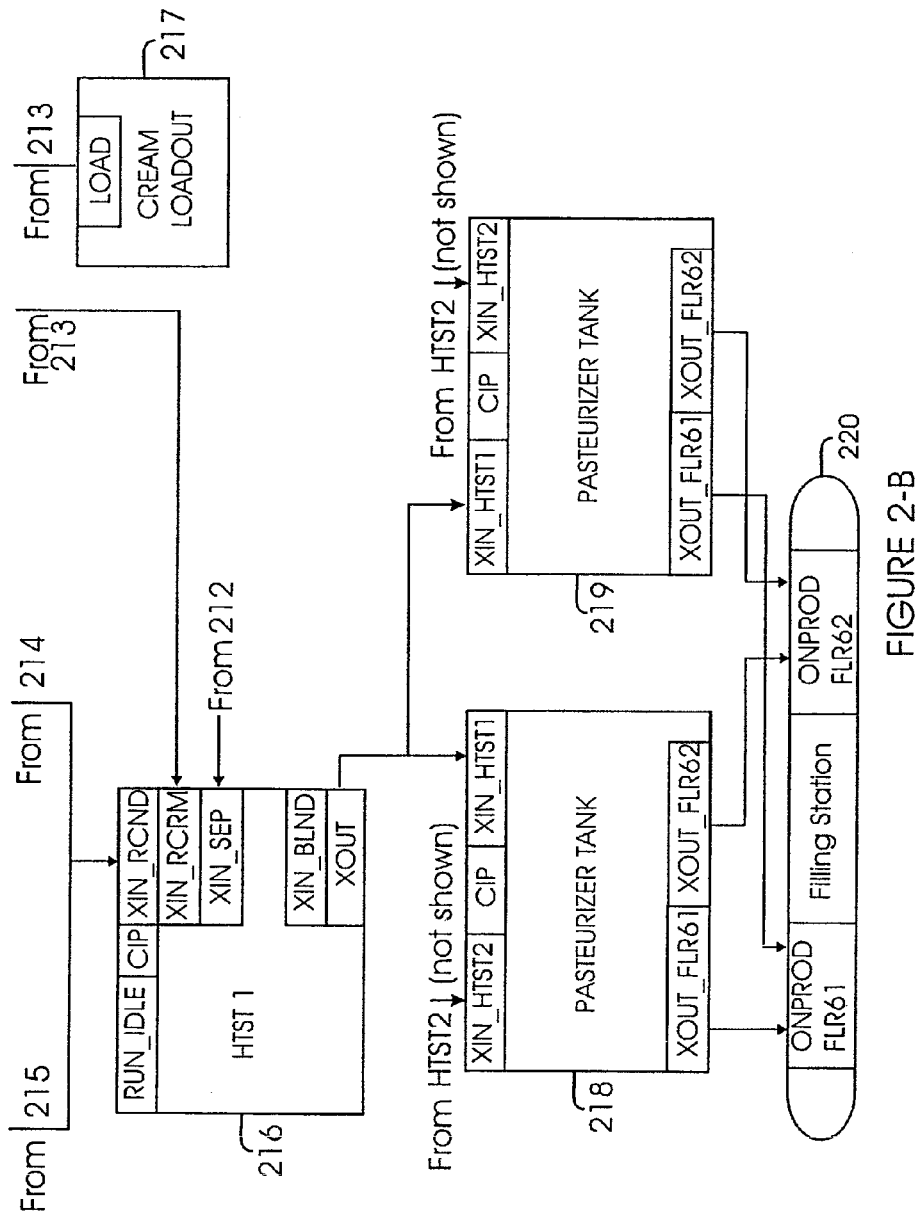
FIGURE 2-B

METHOD AND SYSTEM FOR MONITORING BATCH PRODUCT MANUFACTURING

CROSS REFERENCE TO RELATED APPLICATION

This application is related to and claims priority to the provisional U.S. patent application entitled, "METHOD AND SYSTEM FOR MONITORING BATCH PRODUCT MANUFACTURING", Ser. No. 60/533,498, filing date, Dec. 31, 2003, the disclosure of which is incorporated herein by reference, in its entirety.

BACKGROUND OF THE INVENTION

1. Field of the Invention

The present invention relates to manufacturing processes, and more particularly to monitoring batch manufacturing.

2. Background

Manufacturing of batch (or bulk) products is common today. Some products within the batch product category are milk, juice, oil, cosmetics, pharmaceuticals and other similar products. The term "batch" means non-discrete. A car in this sense is a discrete product, while milk during manufacturing/processing is a batch product.

Monitoring batch product manufacturing is complex and the need to monitor batch processing is compelling today. It is important to have the ability to trace batch products to specific raw material sources and manufacturing units. This is particularly critical if a particular batch of product (for example, milk or any other product) has been contaminated by a terrorist organization. This requires the manufacturing plant to act immediately and with accuracy so that contaminated product can be re-called quickly and efficiently with minimum waste to the businesses that are engaged in batch product manufacturing. Failure to perform this can result in health hazards and/or waste.

Conventional batch product manufacturing plants and techniques do not provide a system and/or methodology to track batch products so that various lots can be tracked. Most batch manufacturing plants can be modeled after the ISA S88.01 industry standard (referred to herein as the S88 standard), published by The International Society of Measurement & Control (ISA) and incorporated herein by reference in its entirety. S88 defines a model and methodology for manufacturing plants. A manufacturing unit in a manufacturing plant is a single logical device and a S88 phase is an activity that is performed on a particular unit in a manufacturing process.

An example of a prior art system 100 is provided in FIG. 1A. System 100 has a receiving bay 101 that is used to receive bulk raw products. For example, in a milk bottling/processing plant, the receiving bay will receive raw milk from various farms/trucks. Various trucks from different farms unload milk into bay 101 and the milk is commingled. From bay 101, raw milk is transferred to a storage unit 102 (may also be referred to "raw silo"). More than one storage unit 102 may be used to store the raw milk.

Milk from various storage units 102 is sent to separator(s) 103. Thereafter, skimmed milk 104 is sent to pasteurizing unit(s) 107 for pasteurizing the milk. Raw cream 105 is sent to cream storage unit(s) 106. Raw cream is also sent from cream storage unit(s) 106 to pasteurizing unit(s) 107. Pasteurized milk is then transferred to storage unit(s) 108 and then moved to filing stations 109.

Currently, programmable logic controllers ("PLCs") are used in the various units described above to collect data. An example of one such PLC is 1756 ControlLogix™ from RockWell Automation™. Typically, these PLCs collect data based on time intervals. The data is captured by an OPC server, which is an industry standard for polling data from PLCs and is incorporated herein by reference in its entirety. An example of this architecture is shown in FIG. 3A and is discussed below.

If milk gets contaminated and has to be recalled, system 100 cannot trace a particular lot to a defined source. System 100, when used to recall product will be inaccurate and potentially result in waste.

Conventional systems have drawbacks, including the following:

Current data collection is performed with a graphical user interface ("GUI"). Data collection schedules are often hard coded and are not flexible. Data is collected based on timestamps at pre-defined intervals. Often correlating data to real events occurs after the fact, which affects the accuracy of the analysis. Therefore, there is a need for a system/methodology that allows efficient and accurate correlation between collected data and real time events in manufacturing plants.

Typically, data is collected by PLCs and analyzed by application programs. The collected data has two states (or attributes), for example, data is either known or unknown to the application. When data is being polled from a PLC, a specific value can trigger an event/process, for example, storing information in a database. The process can be triggered multiple times under certain conditions, for example:

A data value that is being polled for the value of 1 is initially 0.

When this value becomes 1, it triggers a process.

The data value becomes unknown due to a problem, for example, a communication problem with the PLC.

Data value becomes known again after the problem is fixed and is still 1.

Every time this happens, the process is triggered incorrectly.

Therefore, there is a need for defining data states such that processes are not triggered incorrectly resulting in waste and inefficiency.

Another drawback with current process monitoring techniques is that PLCs are designed and sold by plural manufacturers. This requires the PLC data collection system to customize OPC servers (or any other interface) for every make and model. FIG. 3A shows an example of this architecture. PLC1 and PLC2 are coupled to OPC server 1, PLC 3 and PLC4 are coupled to OPC server 2 and PLC5 and PLC6 are coupled to OPC server 3. Application programs 1, 2 and 3 are coupled to OPC servers 1, 2 and 3 to analyze and parse the PLC collected data. This system becomes very tedious and expensive in a manufacturing plant that uses PLCs from different vendors. Therefore there is a need to develop a system that is flexible and efficient in handling PLC data from plural vendors.

SUMMARY OF THE INVENTION

In one aspect of the present invention, a system for monitoring product through a batch manufacturing plant is provided. The system includes, a parallel flow mode when product flows concurrently from at least two units to a single unit; and a serial flow mode where product flows from one unit to another at a given time, wherein the batch manufacturing plant is modeled based on the parallel and serial flow modes. A lot association is built based on product flow and a parent/child record is created for lot association.

The system also includes a data collection system that collects phase information for every unit and a procedure identifier is used to create a batch identifier, where a batch identifier is associated with each lot on each unit through which product is flowing to and/or from at a given time.

In another aspect of the present invention, a method for monitoring batch product manufacturing is provided. The method includes, developing lot association(s) between different phases and units by using a procedure identifier; and creating a batch based on the procedure identifier, where a batch is associated with each lot for each unit through which product flows at a given time.

The method also includes, performing trace filtering and/or bulk filtering for a lot of interest. Data is collected from beginning to end of a phase and a parent/child relationship is created for each lot association. If a child has a batch in common with a parent, the child is included in a lot genealogy of the parent. Also, trace genealogy and/or bulk genealogy is used for developing overall lot genealogy.

In yet another aspect, a method for monitoring batch manufacturing process is provided. The method includes, using a parallel data flow model for tracking process parameters, where during the parallel data flow product flows from a single unit to other units at a given time; and using a serial data flow model for tracking process parameters, where during the serial data flow, product flows from one unit to another at a given time.

The method also includes creating a lot association between different phases and unit by using a procedure identifier; and building a parent/child relationship for each lot association. A lot's genealogy is developed based on batches that are created using a procedure identifier.

In yet another aspect, a system for collecting data in a batch product manufacturing plant is provided. The system includes, a virtual programmable logic controller interface that can collect data from disparate sources and provide a common interface for plural programmable logic controllers ("PLC"). Data is collected from PLCs based on pre-defined rules. The system also includes a phase module that keeps track of plural phases in plural units; a trending module that can collect trending data for various process parameters; and a service monitor module that provides alerts based on certain events.

In yet another aspect, programmable logic controller data collection states are provided. The PLC states include a first state where data is known and was previously unknown; a second state where data is known and was previously unknown; and a third state where data is unknown.

This brief summary has been provided so that the nature of the invention may be understood quickly. A more complete understanding of the invention can be obtained by reference to the following detailed description of the preferred embodiments thereof, in connection with the attached drawings.

BRIEF DESCRIPTION OF THE DRAWINGS

The foregoing features and other features of the present invention will now be described with reference to the drawings of a preferred embodiment. In the drawings, the same components have the same reference numerals. The illustrated embodiment is intended to illustrate, but not to limit the invention. The drawings include the following Figures:

FIGS. 2A-2B (referred to herein as FIG. 2) show a block diagram of a batch manufacturing plant, according to one aspect of the present invention;

DETAILED DESCRIPTION OF THE PREFERRED EMBODIMENTS

Figure 1A:
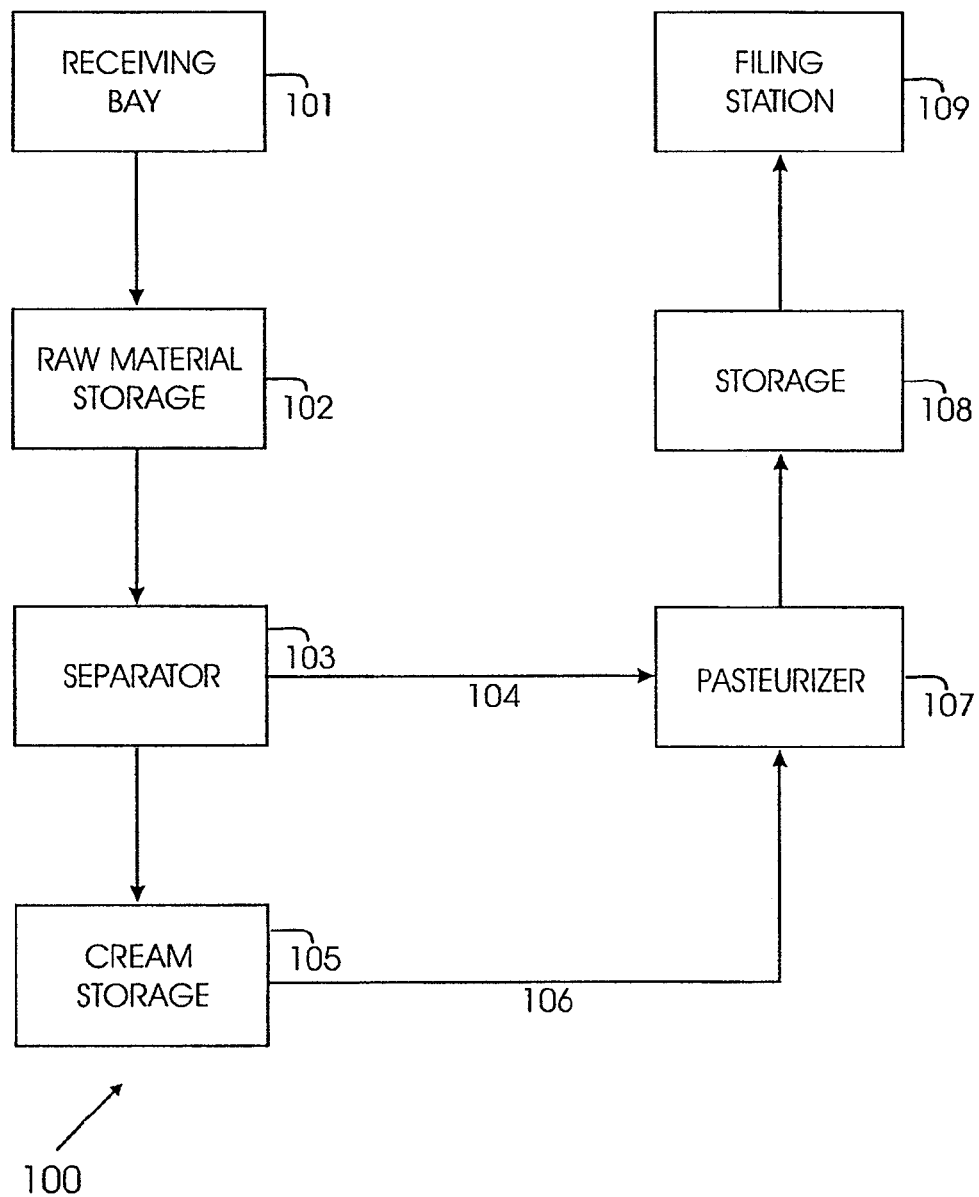
FIG. 1A shows a prior art system for batch product manufacturing.

Definitions: The following definitions are provided as they are typically (but not exclusively) used in the batch product manufacturing environment, implementing the various adaptive aspects of the present invention:

"Batch": Product that flows through one or more units.

"Bulk Genealogy": Lot genealogy where only bulk commingling of product occurs.

"CIP": Clean in place, the abbreviation denotes that Units are cleaned.

"Flow Model": A logical model for product flow within a manufacturing plant.

"Full Wash CIP": A CIP process approved by the Food and Drug Administration for cleaning manufacturing equipment and is designed to remove all residual product and contaminants. This may be used to denote the beginning of a Lot.

"HTST": A "high temperature short time" equipment that is used for pasteurizing milk.

"LGTP": Lot Genealogy and Traceability Process.

"Lot": More than one batch between Lot Generating Event(s) and associated with a manufacturing Unit.

"Lot Associations": Association between Units when product flows from one Unit to another Unit.

"Lot Generating Event": An event that signifies lack of product(including trace amounts) in a Unit, for example, a Full Wash CIP.

"Lot Genealogy": All lots which have contributed to a LOI and all Lots to which an LOI has contributed to are a part of the Lot Genealogy.

"Lot of Interest" ("LOI"): This is the origin of a Lot Genealogy.

"Lot Lifetime": The start and end time for a Lot. The start time is the time when the first product flows since a last Lot Generating Event and the end time is the time of the last product flow before the next Lot Generating Event.

"OPC" Server: OPC Sever is an industry standard interface to a server program for polling data from a PLC.

"Procedure Id": A phase identifier that PLC code uses to inform a Data Collection System about the phases, which are on in a particular Unit at a given time "PLC": Programmable Logic controller, used to control and monitor manufacturing processes and equipment.

"Trace Genealogy": Lot Genealogy where small trace elements co-mingle with the main product.

"S88": Industry Standard for modeling batch manufacturing process.

"Unit": A single device used in a manufacturing plant, for example, a storage tank, a pasteurizer and others.

"XML": Extended Markup Language standard used for describing hierarchical tree structures and incorporated herein by reference in its entirety.

Flow Model:

In one embodiment of the present invention, a batch flow model is used for monitoring and tracking product through a batch manufacturing plant. The flow model uses parallel and serial product flow modes to determine the progress of a particular phase (for example, an S88 phase) with respect to particular Unit(s). FIG. 1D shows an example of the product flow model 110, which has parallel and serial product flow according to one aspect of the present invention.

During parallel product flow, product flows in concurrently from plural units to single unit. An example of this is shown as inputs from Units 118A and 118B via paths 120 and 119 sent to Unit 121.

For product transferred out in parallel mode, unit 122 sends product to units 125 and 126, while product is monitored at locations 124 and 123, respectively.

During serial product flow mode, product flows from a one of many Units to a single Unit. For example, Units 111, 111A and 111B send product via line 112 one at a time to Unit 113. Product is metered at location 113A.

In serial flow mode, unit 114 sends product to only one of Units 116A, 116B or 116C through path 117 at a given time. Product is metered at location 115.

Based on flow model 110, a manufacturing plant can be configured to monitor batch processing and Lot Genealogy.

Overall System Example:

FIG. 2 shows a system according to one embodiment of the present invention, where model 110 is used to efficiently monitor and trace batch product manufacturing. It is assumed that after most Units are fully washed, there is no contamination and that can be the beginning of a Lot. Based on how product moves and when certain units are cleaned, Lot Associations are established. Every Unit has a Lot Identifier ("Lot Id."). The flow model described above allows one to know, which Unit is operating at a given time. A parent/child record is built for each Lot Association and each Lot can have several batches. Every Lot is time stamped and hence a monitoring system that is described in detail below knows which batch/Lot came first.

The LGTP using a data collection system (FIG. 5, 500) tracks bulk products within Units by tracking Batches, Lots, Product Flow and Lot Generating Events. The data collection system collects phase information for every unit in compliance with the S88 standard. Programs (or code) in individual PLCs informs the data collection system 500, which phases are running at a given time in a particular unit by using a Procedure Id. Every phase has an associated integer value (Procedure Id). In one aspect, this value is positive when the phase starts and negative, when the phase ends.

Procedure Ids can be used to associate multiple phases on multiple units that are involved in product flow (i.e. Batch). Defining a single phase as a "Parent Phase" performs this and each parent phase can have multiple phases ("child phases"). Procedure Id is used to create a Batch Id in a database (520, FIG. 5), described below. The Batch is associated with each Lot on each unit through which product is flowing to and/or from. Data collection system 500 determines product flow by using the Flow Model discussed above and by examining the phases that are active for a Batch.

Procedure Ids can be messaged between PLCs. For example, an upstream unit (204, FIG. 2) may start a process and therefore start a phase on a Unit and allocate a Procedure Id for that phase. A downstream unit (210, FIG. 2) that receives product from the upstream unit is controlled by another PLC. The upstream PLC messages the parent Procedure Id to the downstream unit.

FIG. 2 shows various terms that illustrate how Units/Lots/Batches are monitored, according to one aspect of the present invention. For example:

"UNLOAD" denotes that product is unloaded;

"ONPROD" denotes that product flows through;

"XIN_XX": Indicates that product comes from a certain unit, for example, XIN_RB1 indicates that product comes from receiving bay 1;

"XOUT" denotes that product leaves a certain Unit, for example, when product leaves Raw Silo 207, it is indicated by XOUT, a monitoring point; and "XOUT_HTST1": Indicates product leaves from a certain unit to another Unit, for example, HTST1 215.

One or more PLCs are used to monitor the units. For example, a PLC will monitor the "UNLOAD" task from receiving bay 201 and 202, as described in detail below.

Turning in detail to FIG. 2, system 200 includes receiving bays 201 and 202 to receive raw product (for example, milk from different sources). CIP 206 indicates when bay 202 is cleaned. This indicates the beginning of a phase. PLCs monitor the "UNLOAD", task from receiving bays 201 and 202.

Product moves to an intermediate line 203 and from there to raw material storage tanks (raw silo) 207 and 208. PLCs track product flow from line 203 into tanks 207 and 208 ( at XIN_RB1 and XIN_RB2).

Product moves from raw silos 207 and 208 to a transfer line 211 and is monitored by PLCs. Thereafter, raw milk moves to separator 212 and is monitored by PLCs (XIN_XFER-LINES). Separator 212 separates cream from the milk and the skimmed milk is moved to pasteurizer (HTST1) 216 (XOUT_HTST1), while the cream moves to a cream tank 213 (XOUT_CRM) and then to HTST1 216. Again the product movement is monitored.

Raw condensed tanks 215 and 214 receive raw milk from silos 207 and 208 and are monitored at XIN_RB1 and XIN_RB2. Milk from tanks 214 and 215 is also moved to HTST1 216(XIN_RCND). Milk from HTST1 216 is moved to pasteurized tanks 218 and 219 and then sent to filling station 220.

All along the PLCs monitor product flow through the units and also monitor the phase changes based on model 110.

It is noteworthy that the foregoing illustration is only to provide an example of the adaptive aspects of the present invention. The LGTP, data collection system 500 and the various aspects of the present invention may be implemented in batch manufacturing plants and are not limited to any particular product (for example, milk) process steps, or any particular number of Units or Lots. For example, a plant that is producing juice, oil, cosmetics, pharmaceuticals or any other batch product can easily use the inventive aspects of the present invention. Also, a plant may use any number of tanks and still implement the adaptive aspects of the present invention.

Figure 3A:
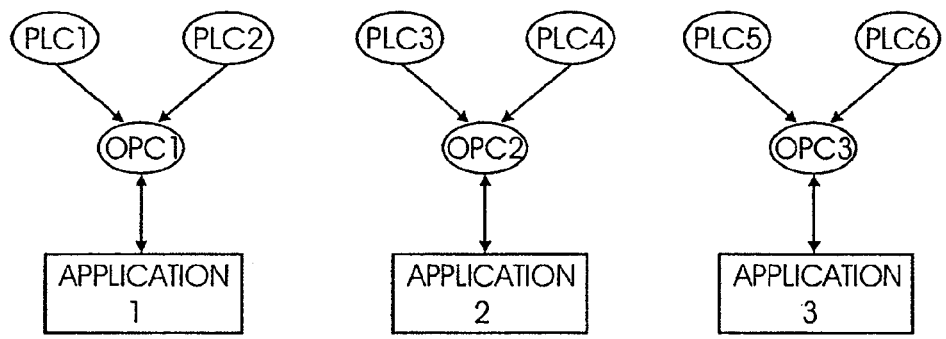
FIG. 3A shows a block diagram of a prior art system using OPC servers.
Figure 3B:
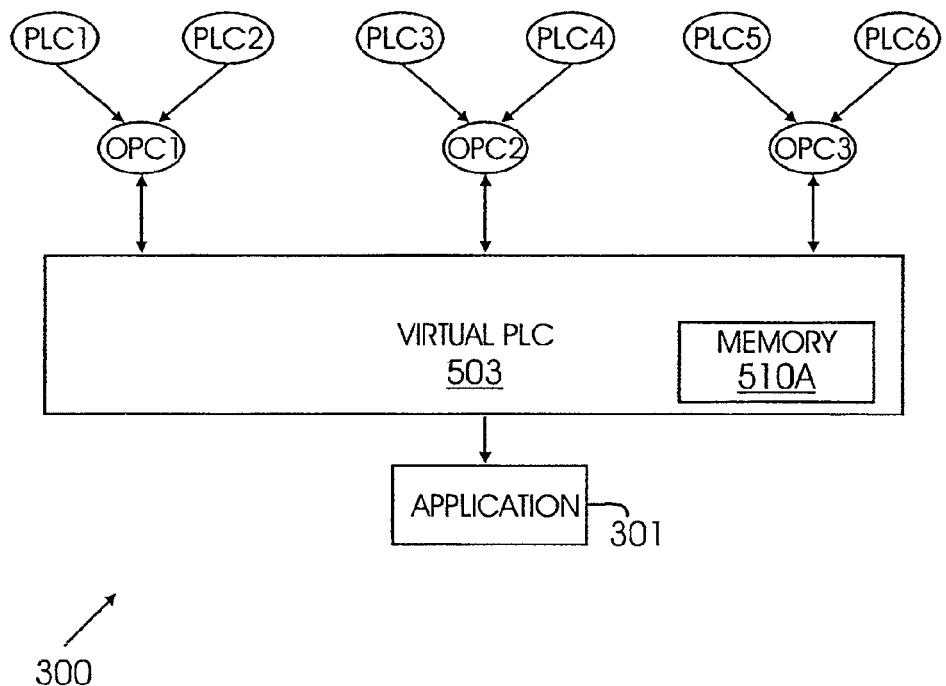
FIG. 3B shows a block diagram of a system using a Virtual PLC module, according to one aspect of the present invention.

The various PLCs, according to the present invention are coupled to OPC servers and plural OPC servers are coupled to a Virtual PLC 503, as shown in FIG. 3B. An application program 301 running on a computing system (as described below) coupled to a network (or to the Internet) may analyze data from Virtual PLC 503. The operation of Virtual PLC 503 is described below in detail with respect to FIG. 5. It is noteworthy that the present adaptive aspects of the present invention are not limited to OPC server interface, and instead any other standard or proprietary interface may be used to implement the various adaptive aspects of the present invention.

Description of a Computing System and Internet Topology:

To facilitate an understanding of the preferred embodiment using the Virtual PLC 503, the general architecture and operation of a computer system and the Internet will now be described. The specific architecture and operation of the preferred embodiment will then be described with reference to the general architecture.

Figure 1B:
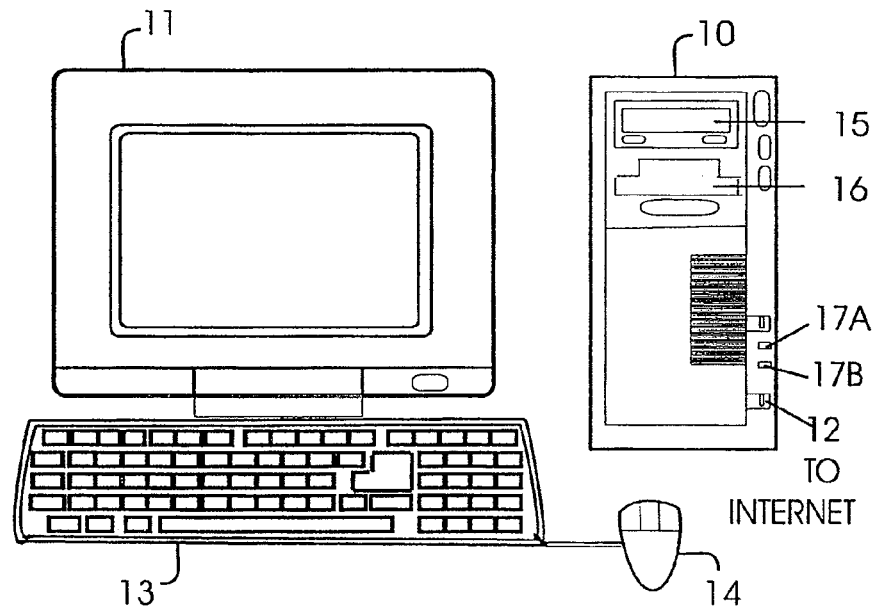
FIG. 1B shows a block diagram of a computing system that can implement the various adaptive aspects of the present invention.

FIG. 1B is a block diagram of a computing system for performing executable process steps according to one aspect of the present invention. FIG. 1 includes a host computer 10 and a monitor 11. Monitor 11 may be a CRT type, a LCD type, or any other type of color or monochrome display. Also provided with computer 10 are a keyboard 13 for entering data and user commands and a pointing device 14 for processing objects displayed on monitor 11.

Computer 10 includes a computer-readable memory medium such as a rotating disk 15 for storing readable data. Besides other programs, disk 15 can store application programs' including web browsers by which computer 10 connects to the Internet and the systems described.

According to one aspect of the present invention, computer 10 can also access computer-readable floppy disks storing data files, application program files, and computer executable process steps embodying the present invention or the like via a floppy disk drive 16. A CD-ROM, or CD R/W (read/write) interface (not shown) may also be provided with computer 10 to access application program files, audio files and data files stored on a CD-ROM.

A modem, an integrated services digital network (ISDN) connection, or the like also provides computer 10 with an Internet connection 12 to the World Wide Web (WWW). The Internet connection 12 allows computer 10 to download data files, application program files and computer-executable process steps embodying the present invention.

Computer 10 is also provided with external audio speakers 17A and 17B to assist a listener to listen to audio files or messages that may be generated based on certain events.

It is noteworthy that the present invention is not limited to the FIG. 1B architecture. For example, notebook or laptop computers, handheld and/or wireless devices, set-top boxes or any other system capable of running computer-executable process steps may be used to implement the various aspects of the present invention.

Figure 1C:
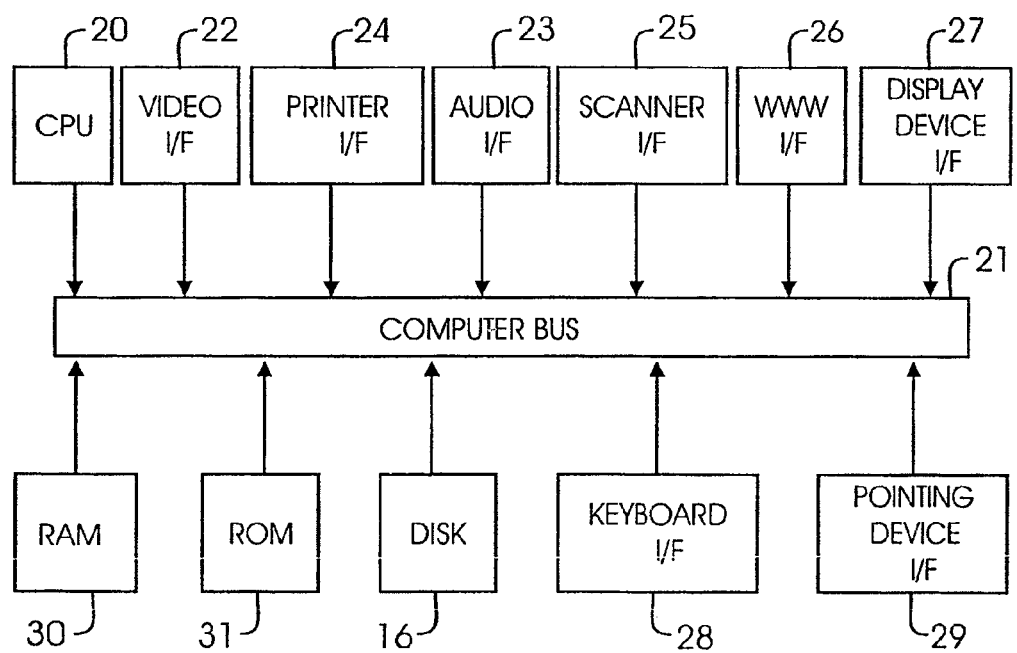
FIG. 1C shows the internal architecture of the computing system in FIG. 1B.
Figure 1D:
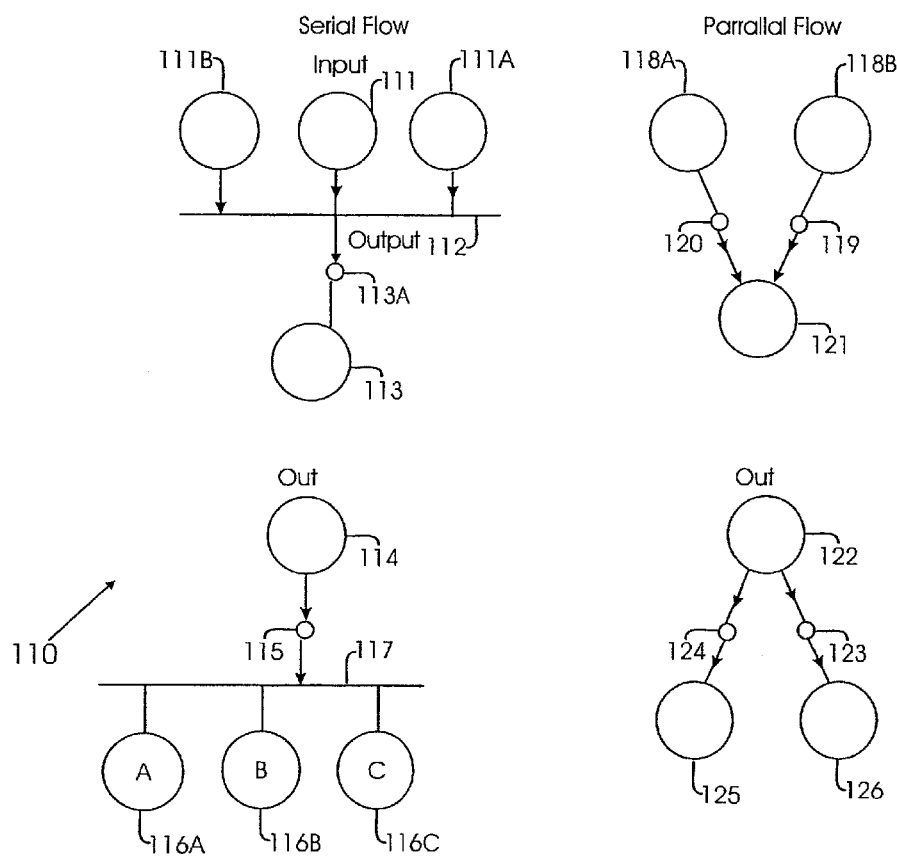
FIG. 1D shows a parallel and serial product flow model, according to one aspect of the present invention.

FIG. 1C is a block diagram showing the internal functional architecture of computer 10. As shown in FIG. 1C, computer 10 includes a CPU 20 for executing computer-executable process steps and interfaces with a computer bus 21. Also shown in FIG. 1C are a video interface 22, an audio interface 23, a printer interface 24, a scanner interface 25, a WWW interface 26, a display device interface 27, a keyboard interface 28, a pointing device interface 29, and a rotating disk 15.

As described above, disk 15 stores operating system program files, application program files, web browsers, and other files. Some of these files are stored on disk 15 using an installation program. For example, CPU 20 executes computer-executable process steps of an installation program so that CPU 20 can properly execute the application program.

Random access memory ("RAM") 30 also interfaces to computer bus 21 to provide CPU 20 with access to memory storage. When executing stored computer-executable process steps from disk 15 (or other storage media such as floppy disk 16 or WWW connection 12), CPU 20 stores and executes the process steps out of RAM 30.

Read only memory ("ROM") 31 is provided to store invariant instruction sequences such as start-up instruction sequences or basic input/output operating system (BIOS) sequences for operation of keyboard 13.

Process steps, according to one aspect of the present invention may be performed using the Internet. Data collected by PLCs may be accessed using the Virtual PLC 503 via the Internet. The following provides a brief description of the Internet.

The Internet connects thousands of computers world wide through well-known protocols, for example, Transmission Control Protocol (TCP)/Internet Protocol (IP), into a vast network. Information on the Internet is stored world wide as computer files, mostly written in the Hypertext Mark Up Language ("HTML"). Other mark up languages, e.g., Extensible Markup Language as published by W3C Consortium, Version 1, Second Edition, October 2000, ©W3C may also be used. The collection of all such publicly available computer files is known as the World Wide Web (WWW). The WWW is a multimedia-enabled hypertext system used for navigating the Internet and is made up of hundreds of thousands of web pages with images and text and video files, which can be displayed on a computer monitor. Each web page can have connections to other pages, which may be located on any computer connected to the Internet.

A typical Internet user uses a client program called a "Web Browser" to connect to the Internet. A user can connect to the Internet via a proprietary network, such as America Online or CompuServe, or via an Internet Service Provider, e.g., Earthlink. The web browser may run on any computer connected to the Internet. Currently, various browsers are available of which two prominent browsers are Netscape Navigator and Microsoft Internet Explorer. The Web Browser receives and sends requests to a web server and acquires information from the WWW. A web server is a program that, upon receipt of a request, sends the requested data to the requesting user. A standard naming convention known as Uniform Resource Locator ("URL") has been adopted to represent hypermedia links and links to network services. Most files or services can be represented with a URL.

URLs enable Web Browsers to go directly to any file held on any WWW server. Information from the WWW is accessed using well-known protocols, including the Hypertext Transport Protocol ("HTTP"), the Wide Area Information Service ("WAIS") and the File Transport Protocol ("FTP"), over TCP/IP protocol. The transfer format for standard WWW pages is Hypertext Transfer Protocol (HTTP).

Figure 3C:
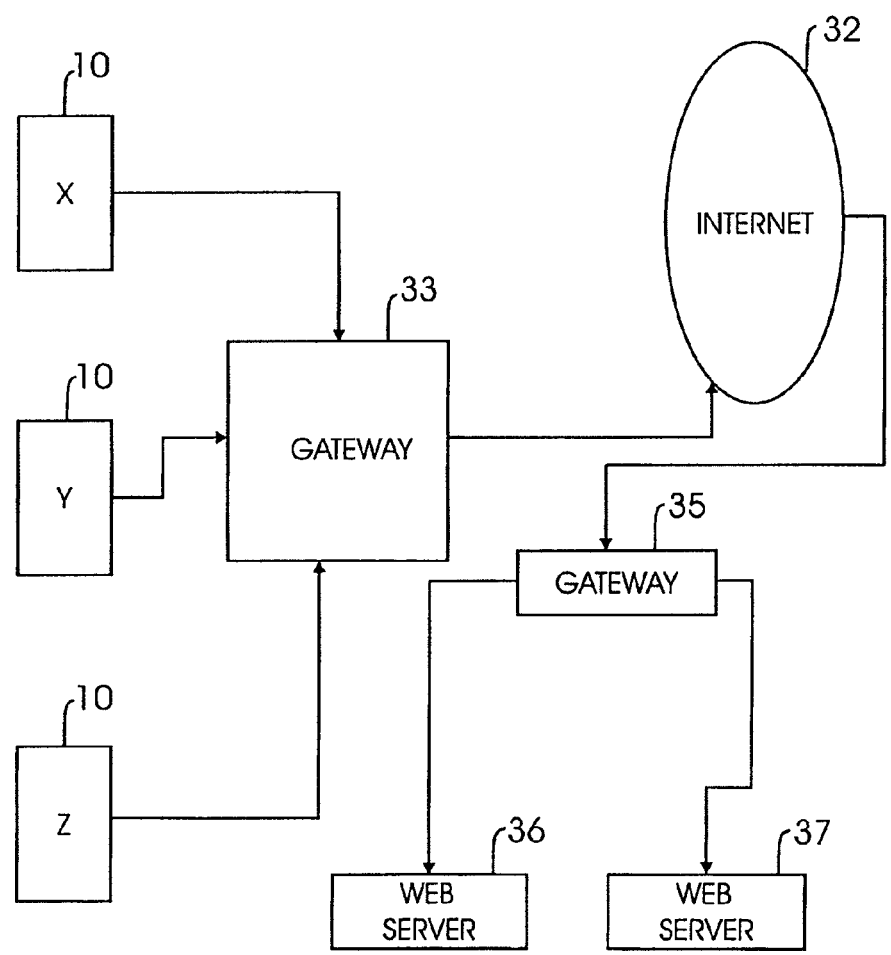
FIG. 3C shows a topology of the Internet that can be used to implement the process, according to one aspect of the present invention.

FIG. 3C shows a typical topology of a computer network with computers similar to computer 10, connected to the Internet. For illustration purposes, three computers X, Y and Z are shown connected to the Internet 32 via WWW interface 26 through a gateway 33, where gateway 33 can interface N number of computers.

WWW interface 26 may be a modem, network interface card or a unit for providing connectivity to other computer systems over a network using protocols such as X.25, Ethernet or TCP/IP, or any device that allows, directly or indirectly, computer-to-computer communications. It is noteworthy that the invention is not limited to a particular number of computers. Any number of computers that can be connected to the Internet 32 or any other computer network may be used.

FIG. 3C further shows a second gateway 35 that connects a network of web servers 36 and 37 to the Internet 32. Web servers 36 and 37 may be connected with each other over a computer network.

Figure 5:
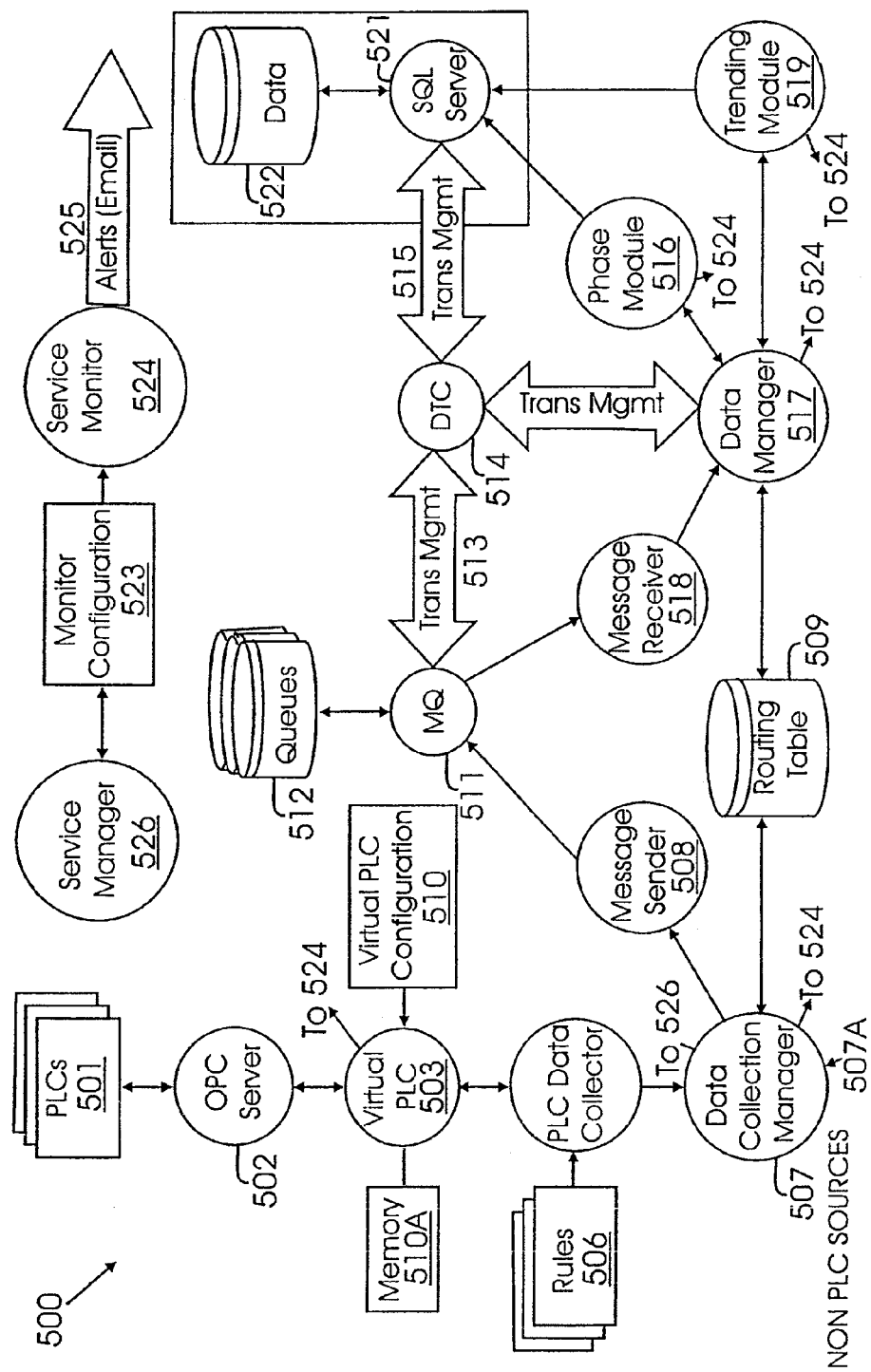
FIG. 5 shows a block diagram of a system that is used to monitor batch product manufacturing, according to one aspect of the present invention.
Figure 6:
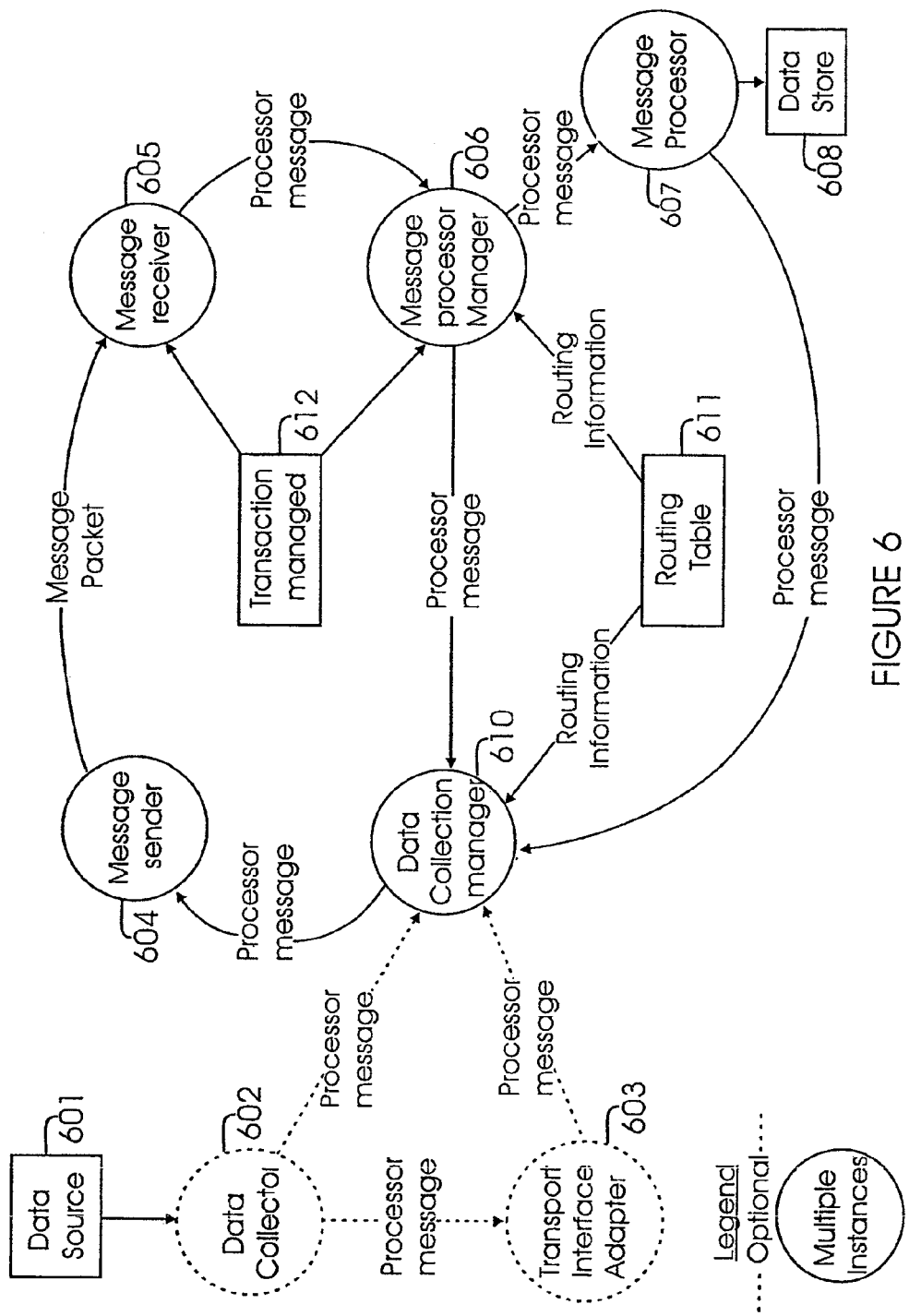
FIG. 6 is a conceptual module used for the system in FIG. 5, according to one aspect of the present invention.

Data Collection Conceptual Model:

FIG. 6 shows the data collection model 600, according to one embodiment of the present invention that is incorporated into the system described below with respect to FIG. 5. Data collector 602 collects data from data source 601. Collector 602 sends the information to data collection manager 610. Adapter 603 is an optional path for a data collector to send data to data collection manager 610 in the event that the data collector 602 cannot interface directly with the collection manager 610. For example, a data collector 602 that is running on Unix may not be able to communicate with data collection manager 610 that is running on Windows using "COM".

Data collection manager 602 also receives input from a message processor manager 606 and a routing table 611. Based on the various inputs, data collection manager 610 generates a message that is sent to message sender 604 that generates a message packet. The message packet is sent to a message receiver 605 that moves the packet to message processor manager 606 that sends the message to a message processor 607 and eventually to a database 608.

The various rules that may be used to collect data are described below.

Data Collection System:

FIG. 5 shows system 500, according to one embodiment of the present invention that can be used to collect and analyze data to monitor batch processing based on model 110. Data is collected by PLCs 501 and sent to an OPC server 502. OPC server 502 is a standard software module that can run on a computing system (for example 10) that is coupled to other devices and computing systems over a network (including the Internet). OPC server 502 is designed to receive information from specific PLCs.

The collected data is sent to Virtual PLC 503 that is configured by configuration module (or file) 510. Virtual PLC 503 is a software program running on a computing system (for example system 10). In one aspect of the present invention configuration file 510 is based on the XML standard. Configuration file 510 includes information regarding scan rates (i.e. the rate at which data is collected from a PLC), the address from where data is collected and where it needs to be sent after it is collected.

Virtual PLC 503 collects data from disparate sources and provides a common interface. Virtual PLC 503 uses virtual memory 510A that keeps track of data related to particular PLCs. Virtual in this sense means that data does not have to be written at the PLC level and instead is written in memory at computing system 10 or otherwise, and is accessible by Virtual PLC 503.

Virtual PLC 503 uses a table and extracts all the information from a particular PLC. Often, when plural PLCs are operating in a plant, an event that occurs on one PLC will require data from another PLC. Virtual PLC 503 constantly polls all PLCs for data.

Also, often data is collected from equipment via software and not by a PLC. To correlate such data to a PLC, often, programmers have to write special conversion routines. Providing virtual memory 510A eliminates this problem, and hence, there is no need to write to PLC memory.

Virtual memory 510A can also include shadow memory that matches data at the PLC level and collects data in real-time by constantly polling. Hence, there is a copy of PLC data in virtual memory 510A.

Data from Virtual PLC 503 is sent to PLC data Collector module 504. The data is collected based on various rules 506 that are described below in detail. Rules 506 define data collection rules and the message that is sent to a software application (DCM 507) to process the data. Rules 506 are based on Event—Condition—Action, i.e. every statement in the system is of the form:

<event><condition><action>

Example of events is as follows:

```
EVERY DAY AT 1:00 PM
ON CHANGE <B993/1 - B993/999>
EVERY 20 seconds
ON UNKNOWN <N900:1>
ON KNOWN <Tank5.Temp>
EVERY MON-FRI AT 12:00 AM
EVERY 15 minutes SYNCHRONIZED
    EVERY DAY AT 1:00 PM occurs every day at 1:00 p.m.
ON CHANGE <B993/1 - B993/999> occurs whenever any data
value within the range B993/1 - B993/999 changes.
    EVERY 20 seconds occurs every 20 seconds.
ON UNKNOWN <N900:1> occurs when the data at N900:1 is not
available, usually due to communication failure.
ON KNOWN <Tank5.Temp> occurs when the data at
Tank5.Temperature becomes available, usually due to
reestablished communications.
EVERY MON-FRI AT 12:00 AM occurs every weekday at
midnight.
EVERY 15 minutes SYNCHRONIZED occurs every 15 minutes
synchronized with the clock, e.g. at 1:00, 1:15, 1:30,
1:45, 2:00, etc.
```

Example of conditions is given below:

```
WHEN VALUE > 0 AND B144/3 = 1
WHEN never
WHEN always
WHEN ST219:7 <> ""
    WHEN VALUE > 0 AND B144/3 = 1 is met when the VALUE
of a PLC location that triggered the <event> is positive
AND the value at B144/3 is 1.
    WHEN never is never met. This is useful for
temporarily removing a condition.
    WHEN always is always met.
    WHEN ST219:7 <> "" is met when the string value at
ST219:7 is NOT empty.
```

Example of actions is provided below:

```
SEND BeginProcedure (ADDRESS, 0, ONE INDEXED OFFSET,
FALSE):
SEND BeginProcedure (ADDRESS, 0, ONE INDEXED OFFSET,
FALSE) sends the message BeginProcedure with the specified
parameters. ADDRESS is the PLC address that triggered the
<event>. ONE INDEXED OFFSET is the offset within the range
of addresses specified for the <event> where the first
item in the range has an offset of 1 (as opposed to Zero
INDEXED OFFSET which starts at 0). FALSE is the value of
0.
    (b) SEND ProcedureUnknown (ADDRESS, 0, ONE INDEXED
OFFSET)
SEND ProcedureUnknown (ADDRESS, 0, ONE INDEXED
OFFSET) sends the message ProcedureUnknown with the
specified parameters.
```

Messages that can be sent with the SEND command are defined in the rule set by a message definition section marked by [MESSAGE DEFINITION]. This section defines valid messages and their associated parameters and types for the specified Data Processor.

The following provides an example of a rule set 506:

```
PROCESSOR = BatchIS
[MESSAGE DEFINITIONS]
BeginProcedure(procedureAddress TYPE IS ADDRESS,
baseProcedureIdOffset TYPE IS NUMBER, procedureId TYPE IS
NUMBER, previouslyUnknown TYPE IS NUMBER)
EndProcedure(procedureAddress TYPE IS ADDRESS,
baseProcedureIdOffset TYPE IS NUMBER, procedureId TYPE IS
NUMBER, previouslyUnknown TYPE IS NUMBER)
ProcedureUnknown(procedureAddress TYPE IS ADDRESS,
baseProcedureIdOffset TYPE IS NUMBER, procedureId TYPE IS
NUMBER)
BeginPhase(phaseAddress TYPE IS ADDRESS, procedureId TYPE
IS NUMBER, parameters TYPE IS ADDRESS_LIST,
previouslyUnknown TYPE IS NUMBER)
EndPhase(phaseAddress TYPE IS ADDRESS, procedureId TYPE IS
NUMBER, parameters TYPE IS ADDRESS_LIST, previouslyUnknown
TYPE IS NUMBER)
PhaseUnknown(phaseAddress TYPE IS ADDRESS)
//////////////////////////////////////////////
//
// WFF rules
//////////////////////////////////////////////
/
{WFF}
[RULES]
ON CHANGE <B993/1 - B993/999>
WHEN VALUE = 1 SEND BeginProcedure (ADDRESS, 0, ONE
INDEXED OFFSET, FALSE)
WHEN VALUE = 0 SEND EndProcedure (ADDRESS, 0, ONE
INDEXED OFFSET, FALSE)
ON KNOWN <B993/1 - B993/999>
WHEN VALUE = 1 SEND BeginProcedure (ADDRESS, 0, ONE
INDEXED OFFSET, TRUE)
WHEN VALUE = 0 SEND EndProcedure (ADDRESS, 0, ONE
INDEXED OFFSET, TRUE)
ON UNKNOWN <B993/1 - B993/999>
WHEN always SEND ProcedureUnknown (ADDRESS, 0, ONE
INDEXED OFFSET)
ON CHANGE <N900:1>
WHEN VALUE > 0 SEND BeginPhase(ADDRESS, ABS_VALUE, <>,
FALSE)
WHEN VALUE < 0 SEND EndPhase(ADDRESS, ABS_VALUE,
<ST409:0, ST419:10, ST409:7, ST409:8>, FALSE)
ON KNOWN <N900:1>
WHEN VALUE > 0 SEND BeginPhase(ADDRESS, ABS_VALUE, <>,
TRUE)
WHEN VALUE < 0 SEND EndPhase(ADDRESS, ABS_VALUE,
<ST409:0, ST419:10, ST409:7, ST409:8>, TRUE)
ON UNKNOWN <N900:1>
WHEN always SEND PhaseUnknown(ADDRESS)
```

Data collected from module 504 is then sent to a data collection manager (DCM") 507 that receives routing information from a routing table 509 DCM 507 can also receive data from non-PLC sources 507A and provides a common interface for data collection from plural and disparate sources. For example, data may be corrected by a computing system (10) or an embedded system (not shown).

Routing table 509 has entries that include the destination and transport information for messages. This information is used by DCM 507 to send a message to message sender 508. In one aspect, the message may be in the XML format.

Message sender 508 forwards the message to Message Queuing system ("MQ") 511. In one aspect of the present invention, MQ 511 is a standard system that is provided by Microsoft Corporations that is incorporated herein by reference in its entirety. MQ 511 stores the messages in queue(s) 512 and when needed, it pulls the message from queue(s) 512.

Message receiver 518 receives the messages from module 511 and sends it to data manager 517. Data manager 517 interacts with routing table 509, a phase module 516 and a trending module 519. Data manager 517 pulls the messages from message receiver 518 as a transaction. All transactions are coordinated by distributed transaction coordinator ("DTC") 514. In one aspect of the present invention, DTC 514 is provided by Microsoft Corporation™ that is incorporated herein by reference in its entirety.

DTC 514 coordinates multiple transactions. For example, DTC 514 coordinates a transaction between say phase module 516 and/or trending module 519 with SQL server 521 and also coordinates the transaction between DCM 517 and phase module 516 and/or trending module 519. It is noteworthy that the present invention is not limited to coordinating transactions involving any particular number/type of modules Phase module 516 keeps track of plural S88 phases in plural units and collects discrete information. This information is stored in database 520 that includes SQL server 521. It is noteworthy that the present invention is not limited to any particular database technology (for example, the SQL technology) and any other database system may be used. SQL server 521 stores various procedures and can command phase module 516 to move Lot Associations, and phase information.

It is noteworthy that database 520 may be coupled to the Internet or any other network in a computing system (for example, 10).

Trending module 519 collects trending data continuously. This can include information on parameters in plural units.

System 500 also includes a service monitor 524 that provides alerts 525 (for example emails) upon certain events (for example, if temperature changes in a storage unit). Service monitor 524 receives input from various modules, for example, virtual PLC 503, data manager 517, trending module 526, phase module 516 and data collection manager 507.

Service manager 526 provides configuration information to module 523 that is sent to monitoring module 524. This establishes the base line for sending alerts 525.

Determining Lot Genealogy: Lot Genealogy involves a LOI and all the descendants and ancestors. A parent/child relationship occurs, when product flows from one Unit to another. Although product may flow from one Lot to another, it does not mean that the Lot is a part of a particular genealogy. The LOI's Batches are used to determine which Lots are to be included in its genealogy. Since a Lot contains Batches, which determines when and where product flow has occurred, the Batches are important to Lot Genealogy process.

In one embodiment of the present invention, Lot Associations are maintained (in database 520) and a LOI is chosen from Lot Associations. The Batches are compared to each child Lot. If a child has batches in common, then it is included in the genealogy and then a new list of batches is build per the following rules:

For Trace Genealogy or Units that store products:

A new list of batches is created from the child Lot's batches without earlier batches from descendants and later batches for ancestors. An earlier batch is one that came before the earliest batch in the new list of batches. A later batch is one that came after the latest batch in the new list.

For Bulk Genealogy and Units that do not store products:

A new list of batches is created from the intersection of the parent and child batches. If there are no batches in common, then the child and its subsequent associations are removed from the genealogy.

The new list of batches is passed on recursively for each remaining child.

Figure 4A:
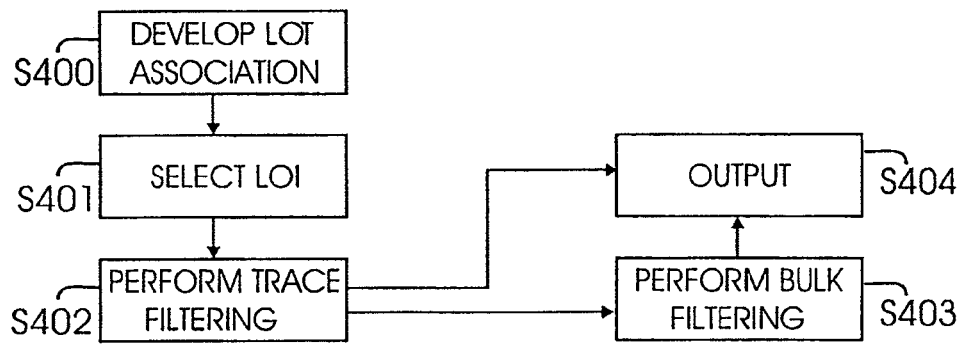
FIG. 4A shows a process flow diagram for determining Lot Genealogy, according to one aspect of the present invention.

FIG. 4A shows a flow diagram of a process according to one aspect of the present invention to monitor batch processing. The process tracks lots within manufacturing units by tracking Batches, Lots, Product Flow and lot generating Events. This is achieved by collecting phase information for every Unit.

Figure 4B:
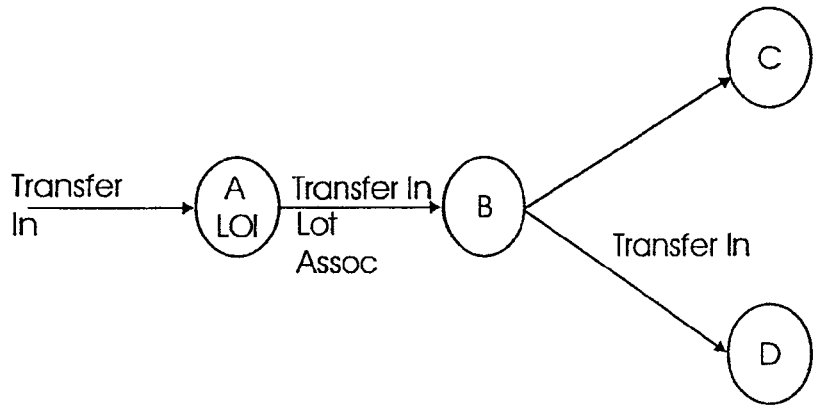
FIG. 4B shows an example of Lot association, according to one aspect of the present invention.

Turning in detail to step S400, the process develops lot associations, as described above. Lot associations are developed between different phases and different units and not to product itself. This is helpful because product mostly moves from one unit to another. This is achieved by using a Procedure Id, which is then used to create a Batch. The Batch is then associated with each lot in each Unit that product is flowing from, to or through. This is achieved by examining every phase that is active for a Batch. FIG. 4B shows an example of various units and how product is flowing. Product is transferred into Unit A and then transferred to Unit B, and from Unit B, product moves to Unit D. This occurs after any transfer takes place between Unit B and C. The parameters in Unit A are tracked and a Lot Association is developed between A and B. Lot Association is also created between B and D. If A is the lot of interest, then the transfer of product from B to C is not considered to be a part of Lot A's genealogy. In one aspect of the present invention, a tree like structure is used for Lot Associations.

In step S401, the process allows a user to select a particular LOI. This can be achieved by using a user interface at computing system 10.

In step S402, the process performs trace genealogy filtering, as described above. Trace filtering monitors small "trace" amount commingling to the main product. This eliminates unnecessary associations so that the overall tracking process is efficient.

Figure 4C:
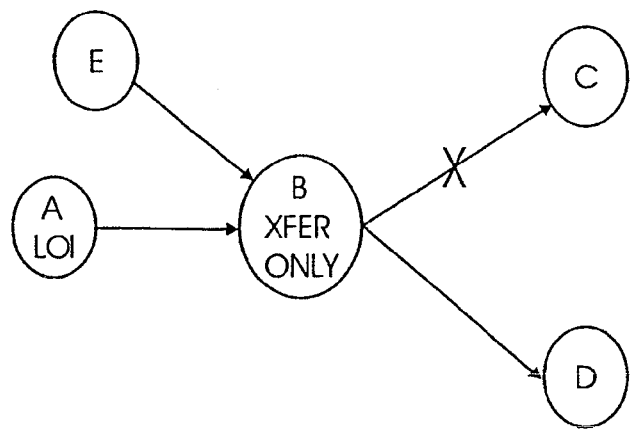
FIG. 4C shows an example of reducing Lot Association, according to one aspect of the present invention.

In step S403, bulk filtering is performed to optimize the overall tracking process, where Bulk Genealogy, bulk commingling of product occurs. Once again redundant associations are eliminated and only useful information is used. FIG. 4C shows a flow diagram for eliminating redundant associations for bulk filtering. Unit E sends product only to Unit C, via unit B. Unit A sends product to Unit D via unit B. For all transfers from A to D, only trace amount commingling occurs in Unit B since B does not store product. Therefore, for bulk filtering, the association between B and C is eliminated.

In step S404, the process outputs Lot Genealogy.

In one aspect of the present invention, data is collected from the beginning of a phase (for example, an S88 phase) and stops collecting data at the end of the phase. In this way information is directly related to a unit or a particular operation. Hence, only important (phase related) information is monitored and analyzed, making the overall monitoring process efficient and cost-effective.

Figure 7:
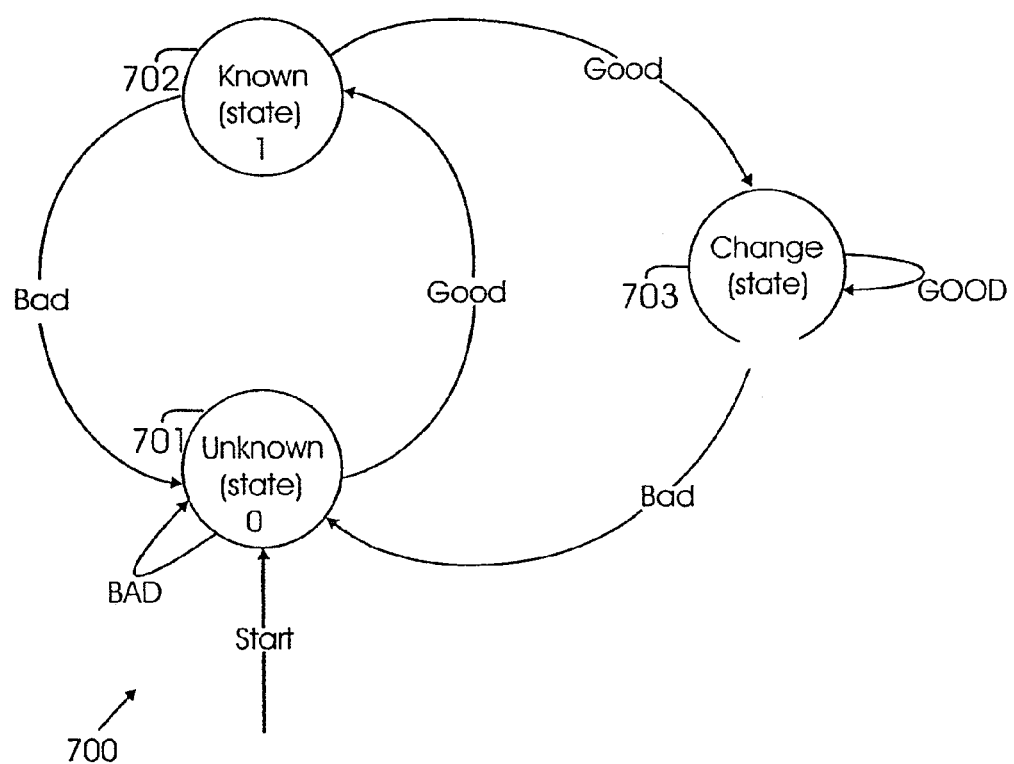
FIG. 7 is a tri-state state diagram for PLC data, according to one aspect of the present invention.

In another aspect of the present invention, three states are available for PLC data, namely, data is known and was previously known, data is known and was previously unknown and data is unknown. FIG. 7 shows a data state diagram with three data states State 0 701, State 1 702 and State 703.

A data value that is being polled for the value of 1 is initially set to unknown (State 0 701).

When the data value becomes known, it goes to State 1 702.

The data value becomes Unknown 701, for example, due to communication problem with a PLC it goes back to State 0 701.

The data value becomes Known (702) again and it is still 1 (State 1, 702). Then it goes to State 2 703 until the data goes bad.

The process is now triggered again, but it has added information that it was "Previously Unknown". This added information helps in avoiding unnecessary event triggers. This avoids double triggering of a process/event when data is unavailable.

While the present invention is described above with respect to what is currently considered its preferred embodiments, it is to be understood that the invention is not limited to that described above. To the contrary, the invention is intended to cover various modifications and equivalent arrangements within the spirit and scope of the appended claims.

What is claimed is:

1. A system for monitoring a product through a batch manufacturing plant in order to trace contamination, comprising:
    a plurality of holding units configured to store a product, wherein at least some of the units can be individually decontaminated;
    a plurality of logical representations of the units, wherein a new logical representation of a unit is created upon decontamination of the unit;
    a plurality of records that identify when a first unit started and stopped feeding into a second unit; and
    at least one contamination tracing component configured to identify one or more source units that could have fed into a target unit based at least in part on start and stop times of feedings stored in the plurality of records, wherein the determination is iteratively applied so as to identify both direct source units that could have directly fed into the target unit and indirect source units that could have fed into the direct source units.

2. A contamination tracking system comprising:
    a plurality of units configured to hold and transport a product;
    a plurality of components configured to detect potential flows from and to source units and target units;
    a database configured to store information about potential flows, including at least a start time and an end time that each potential flow occurred from each source unit to each target unit; and
    a software component configured to select a contaminated target unit and to determine, based at least in part on the potential flow information, at least one source unit that could have made a contribution to the selected target unit and thus could have contributed to the contamination of the contaminated target unit.

3. The system of claim 2, wherein the software component is further configured to recursively determine potential sources of contribution to each source unit so as to determine a plurality of source units that could have contributed to the contamination of the contaminated target unit.

4. The system of claim 3, wherein the software component is further configured to determine, based at least in part on the potential flow information, other target units that could also be contaminated.

5. The system of claim 2, wherein the potential flow database represents each unit logically and a new logical representation for a unit is created upon occurrence of an event that ensures that the unit is free from contamination.

* * * * *